(12) United States Patent
Neal et al.

(10) Patent No.: US 9,125,057 B2
(45) Date of Patent: Sep. 1, 2015

(54) MOBILE DEVICE MANAGEMENT

(71) Applicant: Kajeet, Inc., McLean, VA (US)

(72) Inventors: Daniel John Neal, Chevy Chase, MD (US); Ben Julian Weintraub, Vienna, VA (US)

(73) Assignee: KAJEET, INC., McLean, VA (US)

( * ) Notice: Subject to any disclaimer, the term of this patent is extended or adjusted under 35 U.S.C. 154(b) by 0 days.

(21) Appl. No.: 14/577,616

(22) Filed: Dec. 19, 2014

(65) Prior Publication Data

US 2015/0140969 A1    May 21, 2015

Related U.S. Application Data

(63) Continuation of application No. 13/744,342, filed on Jan. 17, 2013, now Pat. No. 8,918,080.

(60) Provisional application No. 61/587,498, filed on Jan. 17, 2012.

(51) Int. Cl.
| | |
|---|---|
| *H04M 1/66* | (2006.01) |
| *H04W 12/06* | (2009.01) |
| *H04W 12/12* | (2009.01) |
| *H04M 1/725* | (2006.01) |

(52) U.S. Cl.
CPC .......... *H04W 12/06* (2013.01); *H04M 1/72577* (2013.01); *H04W 12/12* (2013.01)

(58) Field of Classification Search
USPC ....................................................... 455/411
See application file for complete search history.

(56) References Cited

U.S. PATENT DOCUMENTS

| | | |
|---|---|---|
| 5,221,838 A | 6/1993 | Gutman et al. |
| 5,285,382 A | 2/1994 | Muehlberger et al. |
| 5,704,046 A | 12/1997 | Hogan |
| 5,914,472 A | 6/1999 | Foladare et al. |
| 5,953,710 A | 9/1999 | Fleming |
| 6,018,724 A | 1/2000 | Arent |

(Continued)

FOREIGN PATENT DOCUMENTS

| | | |
|---|---|---|
| AU | 2006100397 A4 | 3/2007 |
| EP | 0137884 A1 | 7/1983 |

(Continued)

OTHER PUBLICATIONS

U.S. Appl. No. 13/763,348, filed Feb. 8, 2013, Baker.

(Continued)

*Primary Examiner* — Joel Ajayi
(74) *Attorney, Agent, or Firm* — Baker & Hostetler LLP

(57) ABSTRACT

Methods and systems are disclosed for reducing fraud, waste, and abuse of devices associated with government or business programs. Devices are authenticated based on a first set of data collected from the device, and if authenticated, may be permitted to send or receive service requests based on a second set of data that identifies the user, includes data about the user, identifies the service and/or identifies eligibility criteria. Devices may also be subject to eligibility requirements instituted before, during or after a service request is performed that determine the eligibility of the device and/or the user of the device. Devices may also be subject to filtering requirements administered before or during a service request. Devices may also be subject verification before, during or after one or more service requests.

20 Claims, 7 Drawing Sheets

(56) References Cited

U.S. PATENT DOCUMENTS

| | | |
|---|---|---|
| 6,026,291 A | 2/2000 | Carlsson et al. |
| 6,076,075 A | 6/2000 | Teicher |
| 6,173,269 B1 | 1/2001 | Solokl et al. |
| 6,205,436 B1 | 3/2001 | Rosen |
| 6,249,252 B1 * | 6/2001 | Dupray .................. 342/450 |
| 6,345,263 B1 | 2/2002 | Matsumoto et al. |
| 6,529,593 B2 | 3/2003 | Nelson |
| 6,564,047 B1 | 5/2003 | Steele et al. |
| 6,885,877 B1 | 4/2005 | Ozaki et al. |
| 6,957,058 B2 | 10/2005 | Chan et al. |
| 6,968,198 B2 | 11/2005 | Nylund |
| 6,990,182 B2 | 1/2006 | Nelson |
| 7,024,174 B2 | 4/2006 | Nagy et al. |
| 7,024,390 B1 | 4/2006 | Mori et al. |
| 7,133,846 B1 | 11/2006 | Ginter et al. |
| 7,155,411 B1 | 12/2006 | Blinn et al. |
| 7,206,769 B2 | 4/2007 | Laurent et al. |
| 7,209,957 B2 | 4/2007 | Patron et al. |
| 7,248,855 B2 | 7/2007 | Joyce et al. |
| 7,249,092 B2 | 7/2007 | Dunn et al. |
| 7,302,272 B2 | 11/2007 | Ackley |
| 7,330,717 B2 | 2/2008 | Gidron et al. |
| 7,333,796 B2 | 2/2008 | Scalisi et al. |
| 7,359,880 B2 | 4/2008 | Abel et al. |
| 7,434,723 B1 | 10/2008 | White et al. |
| 7,457,609 B2 | 11/2008 | Cai |
| 7,516,219 B2 | 4/2009 | Moghaddam et al. |
| 7,580,699 B1 | 8/2009 | Shaw et al. |
| 7,593,714 B2 | 9/2009 | Schultz et al. |
| 7,869,790 B2 | 1/2011 | Singh et al. |
| 7,869,792 B1 | 1/2011 | Zhou et al. |
| 7,873,538 B2 | 1/2011 | Karaoguz et al. |
| 7,881,697 B2 | 2/2011 | Baker et al. |
| 7,899,438 B2 | 3/2011 | Baker et al. |
| 7,933,799 B2 | 4/2011 | Aaltonen et al. |
| 7,945,238 B2 | 5/2011 | Baker et al. |
| 7,945,242 B2 | 5/2011 | Kahn |
| 8,019,354 B2 | 9/2011 | Rae et al. |
| 8,068,825 B2 | 11/2011 | Mikan et al. |
| 8,078,140 B2 | 12/2011 | Baker et al. |
| 8,285,249 B2 | 10/2012 | Baker et al. |
| 8,340,638 B2 | 12/2012 | Patterson et al. |
| 8,577,795 B2 | 11/2013 | Clubb et al. |
| 8,654,687 B2 | 2/2014 | Koorapaty et al. |
| 8,693,358 B2 | 4/2014 | Hodges |
| 8,698,741 B1 | 4/2014 | Wang et al. |
| 8,817,699 B2 | 8/2014 | Liu et al. |
| 8,918,080 B2 | 12/2014 | Neal |
| 2001/0007983 A1 | 7/2001 | Lee |
| 2001/0011250 A1 | 8/2001 | Paltenghe et al. |
| 2001/0032192 A1 | 10/2001 | Putta et al. |
| 2001/0047310 A1 | 11/2001 | Russell |
| 2002/0022472 A1 | 2/2002 | Watler et al. |
| 2002/0055911 A1 | 5/2002 | Guerreri |
| 2002/0123938 A1 | 9/2002 | Yu et al. |
| 2002/0176553 A1 | 11/2002 | Aschir |
| 2002/0178118 A1 | 11/2002 | Hamilton et al. |
| 2002/0179704 A1 | 12/2002 | Deaton |
| 2002/0187772 A1 | 12/2002 | Hyyppa et al. |
| 2002/0193102 A1 | 12/2002 | Hyyppa et al. |
| 2003/0026404 A1 | 2/2003 | Joyce et al. |
| 2003/0055785 A1 | 3/2003 | Lahiri |
| 2003/0083954 A1 | 5/2003 | Namba |
| 2003/0182420 A1 | 9/2003 | Jones et al. |
| 2003/0220835 A1 | 11/2003 | Barnes, Jr. |
| 2004/0111329 A1 | 6/2004 | Moore |
| 2004/0132438 A1 | 7/2004 | White |
| 2004/0139018 A1 | 7/2004 | Anderson et al. |
| 2004/0143550 A1 | 7/2004 | Creamer et al. |
| 2004/0198335 A1 | 10/2004 | Campen |
| 2004/0229600 A1 | 11/2004 | Saez et al. |
| 2004/0235457 A1 | 11/2004 | Florkey et al. |
| 2004/0236688 A1 | 11/2004 | Bozeman |
| 2004/0253941 A1 | 12/2004 | Rivera et al. |
| 2005/0013423 A1 | 1/2005 | Eversen et al. |
| 2005/0096009 A1 | 5/2005 | Ackley |
| 2005/0113130 A1 | 5/2005 | Weinzierl |
| 2005/0171715 A1 | 8/2005 | Saitoh et al. |
| 2005/0216424 A1 | 9/2005 | Gandre et al. |
| 2005/0282559 A1 | 12/2005 | Erskine et al. |
| 2006/0019632 A1 | 1/2006 | Cunningham et al. |
| 2006/0025139 A1 | 2/2006 | Bales et al. |
| 2006/0116105 A1 | 6/2006 | Frankel et al. |
| 2006/0135140 A1 | 6/2006 | Rothman et al. |
| 2006/0252410 A1 | 11/2006 | Bakita et al. |
| 2006/0276180 A1 | 12/2006 | Henry, Jr. |
| 2006/0293057 A1 | 12/2006 | Mazerski et al. |
| 2007/0003034 A1 | 1/2007 | Schultz et al. |
| 2007/0004386 A1 | 1/2007 | Singh et al. |
| 2007/0021102 A1 | 1/2007 | Sherman |
| 2007/0058812 A1 | 3/2007 | Ali et al. |
| 2007/0060100 A1 | 3/2007 | Watler et al. |
| 2007/0077911 A1 | 4/2007 | Raman |
| 2007/0095892 A1 | 5/2007 | Lyons et al. |
| 2007/0099609 A1 | 5/2007 | Cai |
| 2007/0105529 A1 | 5/2007 | Lundstrom et al. |
| 2007/0125840 A1 | 6/2007 | Law et al. |
| 2007/0135135 A1 | 6/2007 | Brown |
| 2007/0155364 A1 | 7/2007 | Andersson |
| 2007/0164098 A1 | 7/2007 | Khalid et al. |
| 2007/0172039 A1 | 7/2007 | Mendiola et al. |
| 2007/0179974 A1 | 8/2007 | Cai et al. |
| 2007/0198432 A1 | 8/2007 | Pitroda et al. |
| 2007/0243862 A1 | 10/2007 | Coskun et al. |
| 2007/0245026 A1 | 10/2007 | Martin et al. |
| 2007/0267479 A1 | 11/2007 | Nix et al. |
| 2007/0277230 A1 | 11/2007 | Hawkins et al. |
| 2008/0014904 A1 | 1/2008 | Crimi et al. |
| 2008/0015881 A1 | 1/2008 | Shankar |
| 2008/0033880 A1 | 2/2008 | Fiebiger et al. |
| 2008/0039189 A1 | 2/2008 | Walker et al. |
| 2008/0096524 A1 | 4/2008 | True et al. |
| 2008/0119162 A1 | 5/2008 | Sivalingam et al. |
| 2008/0130849 A1 | 6/2008 | Mock et al. |
| 2008/0146211 A1 | 6/2008 | Mikan et al. |
| 2008/0146259 A1 | 6/2008 | Chin et al. |
| 2008/0312968 A1 | 12/2008 | Hannon et al. |
| 2009/0119132 A1 | 5/2009 | Bolano et al. |
| 2010/0064341 A1 | 3/2010 | Aldera |
| 2012/0044807 A1 | 2/2012 | Johnson et al. |
| 2012/0149337 A1 | 6/2012 | Singh et al. |
| 2013/0029653 A1 | 1/2013 | Baker |
| 2013/0065555 A1 | 3/2013 | Baker et al. |

FOREIGN PATENT DOCUMENTS

| | | |
|---|---|---|
| EP | 0172670 A2 | 2/1986 |
| EP | 1041520 A2 | 4/2000 |
| EP | 1072997 A1 | 1/2001 |
| EP | 1132839 A1 | 9/2001 |
| EP | 1450322 A1 | 8/2004 |
| EP | 1528513 A1 | 5/2005 |
| EP | 1798659 A1 | 6/2007 |
| EP | 1798943 A1 | 6/2007 |
| FR | 2863088 B2 | 6/2005 |
| GB | 2419970 A | 5/2006 |
| GB | 2425621 A | 11/2006 |
| GB | 2431072 A | 4/2007 |
| JP | 59-062976 A | 4/1984 |
| JP | 9-179921 A | 7/1997 |
| JP | 9-185658 A | 7/1997 |
| JP | 12-48144 A | 2/2000 |
| JP | 12-251154 A | 9/2000 |
| JP | 12-331100 A | 11/2000 |
| JP | 13-134689 A | 5/2001 |
| JP | 13-291039 A | 10/2001 |
| JP | 15-209880 A | 7/2003 |
| JP | 16-102726 A | 4/2004 |
| JP | 18-139433 A | 6/2006 |
| JP | 18-309786 A | 11/2006 |
| JP | 19-323337 A | 12/2007 |
| KR | 2001088369 A | 9/2001 |
| KR | 2002010160 A | 2/2002 |
| KR | 2002016161 A | 3/2002 |

(56) References Cited

FOREIGN PATENT DOCUMENTS

| KR | 2003044475 A | 6/2003 |
|---|---|---|
| KR | 2004089144 A | 10/2004 |
| KR | 2005048166 A | 5/2005 |
| KR | 2007018329 A | 2/2007 |
| WO | WO 01/35353 | 5/2001 |
| WO | WO 02/084989 A2 | 10/2002 |
| WO | WO 03/092348 A2 | 11/2003 |
| WO | WO 2004/100094 A2 | 11/2004 |
| WO | WO 2005/015831 A2 | 2/2005 |
| WO | WO 2005/017793 A1 | 2/2005 |
| WO | WO 2005/081664 A2 | 9/2005 |

OTHER PUBLICATIONS

U.S. Appl. No. 13/786,735, filed Mar. 6, 2013, Baker.
U.S. Appl. No. 13/786,754, filed Mar. 6, 2013, Baker.
U.S. Appl. No. 13/786,775, filed Mar. 6, 2013, Baker.
U.S. Appl. No. 13/786,788, filed Mar. 6, 2013, Baker.
U.S. Appl. No. 13/786,802, filed Mar. 6, 2013, Baker.
U.S. Appl. No. 13/786,685, filed Mar. 6, 2013, Baker.
U.S. Appl. No. 13/786,694, filed Mar. 6, 2013, Baker.
U.S. Appl. No. 13/786,703, filed Mar. 6, 2013, Baker.
U.S. Appl. No. 13/786,730, filed Mar. 6, 2013, Baker.
U.S. Appl. No. 13/786,745, filed Mar. 6, 2013, Baker.
U.S. Appl. No. 13/786,922, filed Mar. 6, 2013, Baker.
U.S. Appl. No. 13/786,950, filed Mar. 6, 2013, Baker.
U.S. Appl. No. 13/786,966, filed Mar. 6, 2013, Baker.
U.S. Appl. No. 13/786,986, filed Mar. 6, 2013, Baker.
U.S. Appl. No. 13/787,004, filed Mar. 6, 2013, Baker.
U.S. Appl. No. 13/786,917, filed Mar. 6, 2013, Baker.
U.S. Appl. No. 13/786,949, filed Mar. 6, 2013, Baker.
U.S. Appl. No. 13/786,974, filed Mar. 6, 2013, Baker.
U.S. Appl. No. 13/787,610, filed Mar. 6, 2013, Baker.
U.S. Appl. No. 13/787,111, filed Mar. 6, 2013, Baker.
U.S. Appl. No. 13/672,607, filed Nov. 8, 2012, Baker.
Boyd, "Here Comes the Wallet Phone", IEEE Spectrum, Nov. 2005, pp. 12-14, www.spectrum.ieee.org.
Carstens, "Mechanism for Compiling Payment Information on Mobile Terminals", Jun. 2005, Ip.com, #IPCOM000124834D.
Diesposti et al., "Dual-Use Personal NavCom Service", IEEE 2000, pp. 69-79, 0-7803-5846-5/00.
Ebringer et al., "Parasitic Authentication to Protect Your E-Wallet", IEEE Computer Oct. 2000, pp. 54-60, 0018-9162/00.
Hung et al, "Security and Privacy Aspects of SmartFlow Internet Payment System", IEEE 1999.
IBM TBD, "Micropayment Scheme", Ip.com, #IPCOM000013249D, originally published Apr. 1, 2001, Ip.com published Jun. 18, 2003.
Integrated Mobile, Inc., Family-friendly Mobile Services, Presentation, Executive Overview, Nov. 10, 2003, 1-39.
Ishikawa et al., "Mixed-Reality 'Party-Line Night Club'—Synchronization of Networked Avatars and Applications with Mobile Phone Ringtones: Integrating Java3d and LAN-tap Roomware with J2ME", Proceedings of the 2005 The Fifth International Conference on Computer and Information Technology (CIT'05), IEEE 2005, 0-7695-2432-X/05.
Kostov et al., "Cellular Phone Ringing Tone Recommendation System Based on Collaborative Filtering Method", IEEE 2003, pp. 378-383, 0-7803-7866-0/03.
Labrou et al, "Wireless Wallet", Proceedings of the First Annual International conference on Moibile and Ubiquitious Sustems: Networking and Services, 2004.
Lee et al.. "i-Ring: A System for Humming Transcription and Chord Generation". IEEE 2004, pp. 1031-1034, 0-7803-8603-5/04.
Lennox, J. and Schulzrinne, H., "Feature Interaction in Internet Telephony", Sixth Feature Interaction Workshop, May 17, 2000, pp. 1-15.
Leung et al., "On Designing a Flexible E-Payment System with Fraud Detection Capability", IEEE 2004, Proceedings of the IEEE International Conference on E-Commerce Technology, 0-7695-2098-7/04.

Me et al, "EC-Pay: An Efficient and Secure ECC-based Wireless Local Payment Scheme", Proceedings of the Third International Conference on Information Technology and Applications 2005.
Mjolsnes et al., "On-line E-Wallet System with Decentralized Credential Keepers", Mobile Networks and Applications 8, pp. 87-99, published by Kluwer Academic Publishers, 2003.
Pierce et al., "RF Wallet With Fraud Protection", Ip.com, #IPCOM000009305D, originally published Jun. 1, 1999, Ip.com published Aug. 15, 2002.
Raposo et al, "A Web Agent for Automating E-commerce Operations", Proceedings of the IEEE International Conference on E-Commerce 2003.
Schmandt et al., "Impromptu: Managing Networked Audio Applications for Mobile Users", ACM 2004, pp. 59-69, 1-58113-793—Jan. 4, 2006.
Tang et al., "Distributed Family Wallet Architecture and Secure Inter-Purse Operations", IEEE 2000, pp. 110-111, 0-7803-6301-9/00.
Varshney, "Location Management for Mobile Commerce Applications in Wireless Internet Environment", ACM Transactions on Internet Technology, vol. 3, No. 3, Aug. 2003, pp. 236-255.
Yang et al, "A Three-Party Authenticated Key Exchange Scheme Smartcard using Elliptic Curve Cryptosystem for Secure Key Exchange in Wireless Sensor Network", IEEE, 2007.
Creus et al., "Feature Interaction Control on Smartphones", 2007, IEEE, pp. 302-309.
U.S. Appl. No. 13/603,218: Non-Final Office Action dated Dec. 24, 2012, 6 pages.
U.S. Appl. No. 13/603,218: Final Office Action dated Jun. 10, 2013, 15 pages.
U.S. Appl. No. 13/786,735: Non-Final Office Action dated Jun. 7, 2013, 42 pages.
U.S. Appl. No. 13/786,754: Non-Final Office Action dated Jun. 4, 2013, 36 pages.
U.S. Appl. No. 13/786,775: Non-Final Office Action dated Jun. 5, 2013, 26 pages.
U.S. Appl. No. 13/786,788: Non-Final Office Action dated Jun. 28, 2013, 24 pages.
U.S. Appl. No. 13/786,802: Non-Final Office Action dated Jul. 2, 2013, 9 pages.
U.S. Appl. No. 13/786,685: Non-Final Office Action dated Jun. 14, 2013, 23 pages.
U.S. Appl. No. 13/786,694: Non-Final Office Action dated Jun. 20, 2013, 25 pages.
U.S. Appl. No. 13/786,703: Non-Final Office Action dated Jun. 28, 2013, 34 pages.
U.S. Appl. No. 13/786,730: Non-Final Office Action dated Jul. 17, 2013, 30 pages.
U.S. Appl. No. 13/786,745: Non-Final Office Action dated May 31, 2013, 33 pages.
U.S. Appl. No. 13/786,922: Non-Final Office Action dated Jun. 20, 2013, 25 pages.
U.S. Appl. No. 13/786,950: Non-Final Office Action dated Jun. 20, 2013, 28 pages.
U.S. Appl. No. 13/786,966: Non-Final Office Action dated Jun. 20, 2013, 30 pages.
U.S. Appl. No. 13/786,986: Non-Final Office Action dated Jun. 5, 2013, 23 pages.
U.S. Appl. No. 13/787,004: Non-Final Office Action dated Aug. 5, 2013, 25 pages.
U.S. Appl. No. 13/786,917: Non-Final Office Action dated Aug. 5, 2013, 17 pages.
U.S. Appl. No. 13/786,949: Non-Final Office Action dated Aug. 5, 2013, 17 pages.
U.S. Appl. No. 13/763,348: Non-Final Office Action dated Jun. 21, 2013, 21 pages.
U.S. Appl. No. 13/786,974: Non-Final Office Action dated Jul. 5, 2013, 22 pages.
U.S. Appl. No. 13/787,610: Non-Final Office Action dated Jul. 19, 2013, 21 pages.
Declaration of Matthew Donald Baker, Steven Ira Geller, Douglas Owen Kesser, Daniel John Neal, Carol Ann Politi and Ben Julian

(56) References Cited

OTHER PUBLICATIONS

Weintraub Under 37 C.F.R. .sctn. 1.131, filed with the U.S. Appl. No. 13/786,735 on Sep. 9, 2013, 3,757 pages (attachments submitted as 9 separate NPL documents).
U.S. Appl. No. 13/786,754: Notice of Allowance dated Oct. 18, 2013, 12 pages.
U.S. Appl. No. 13/786,775: Notice of Allowance dated Sep. 24, 2013, 6 pages.
U.S. Appl. No. 13/786,802: Notice of Allowance dated Nov. 1, 2013, 7 pages.
U.S. Appl. No. 13/786,745: Notice of Allowance dated Sep. 16, 2013, 6 pages.
U.S. Appl. No. 13/603,218: Non-Final Office Action dated Nov. 27, 2013, 12 pages.
U.S. Appl. No. 13/786,685: Non-Final Office Action dated Jan. 2, 2014, 30 pages.
U.S. Appl. No. 13/786,703: Notice of Allowance dated Nov. 25, 2013, 34 pages.
U.S. Appl. No. 13/786,730: Notice of Allowance dated Dec. 18, 2013, 15 pages.
U.S. Appl. No. 13/786,922: Notice of Allowance dated Dec. 6, 2013, 12 pages.
U.S. Appl. No. 13/786,950: Notice of Allowance dated Dec. 11, 2013, 12 pages.
U.S. Appl. No. 13/787,004: Notice of Allowance dated Dec. 10, 2013, 12 pages.
U.S. Appl. No. 13/763,348: Notice of Allowance dated Dec. 9, 2013, 12 pages.
U.S. Appl. No. 13/787,610: Notice of Allowance dated Dec. 16, 2013, 12 pages.
U.S. Appl. No. 13/787,111: Non-Final Office Action dated Nov. 12, 2013, 17 pages.
U.S. Appl. No. 13/786,735: Non-Final Office Action dated Jan. 29, 2014, 37 pages.
U.S. Appl. No. 13/786,694: Non-Final Office Action dated Feb. 4, 2014, 31 pages.

\* cited by examiner

MOBILE DEVICE MANAGEMENT

CROSS REFERENCE TO RELATED APPLICATIONS

This application is a continuation of U.S. patent application Ser. No. 13/744,342, filed Jan. 17, 2013, now U.S. Pat. No. 8,918,080, issued Dec. 23, 2014, which claims benefit under 35 U.S.C. §119(e) of Provisional U.S. Patent Application No. 61/587,498, filed Jan. 17, 2012, the contents of which is incorporated herein by reference in its entirety.

TECHNICAL FIELD

The subject matter disclosed herein relates to managing the use of a device. More specifically, the disclosure relates to managing the individuals that may utilize a device and the content obtained by the device.

BACKGROUND

The Federal Government (through various states) provides basic telecom connectivity to underprivileged individuals through a government-subsidized program named Lifeline (or Link-up). Individuals that participate in Lifeline are allowed to subscribe to only one Lifeline device (e.g., mobile phone) at a time. States have specified the eligibility requirements to participate in the Lifeline program. Individuals that want to obtain a Lifeline device must meet the requirements for their state of residency. For example, some states utilize criteria that individuals must be on a low-income program (e.g., Welfare, Supplemental Nutrition Assistance Program, Federal Housing Assistance Program—Section 8, etc.) to be eligible for the Lifeline program.

An individual's initial eligibility is verified by the individual physically signing a form stating that the individual meets the state's criteria. The individual may have to sign this form yearly to remain in the Lifeline program. The FCC has identified that fraud, waste, and abuse are occurring via Lifeline services because Lifeline services are being provided to individuals that do not meet the eligibility requirements and/or to individuals that are subscribed to more than one service at a time (see NPRM FCC-11-32 released Mar. 4, 2011).

Methods and systems which would reduce the identified fraud, waste, and abuse would be beneficial. This disclosure describes methods and systems which may verify eligibility requirements. Further, this disclosure describes methods and systems which identify participants that may be utilizing more than one service at a time. These methods and systems would reduce fraud, waste, and abuse in the Lifeline program.

BRIEF DESCRIPTION OF THE DRAWINGS

Non-limiting and non-exhaustive examples will be described with reference to the following figures, wherein like reference numerals refer to like parts throughout the various figures.

DETAILED DESCRIPTION OF ILLUSTRATIVE EMBODIMENTS

Figure 1:
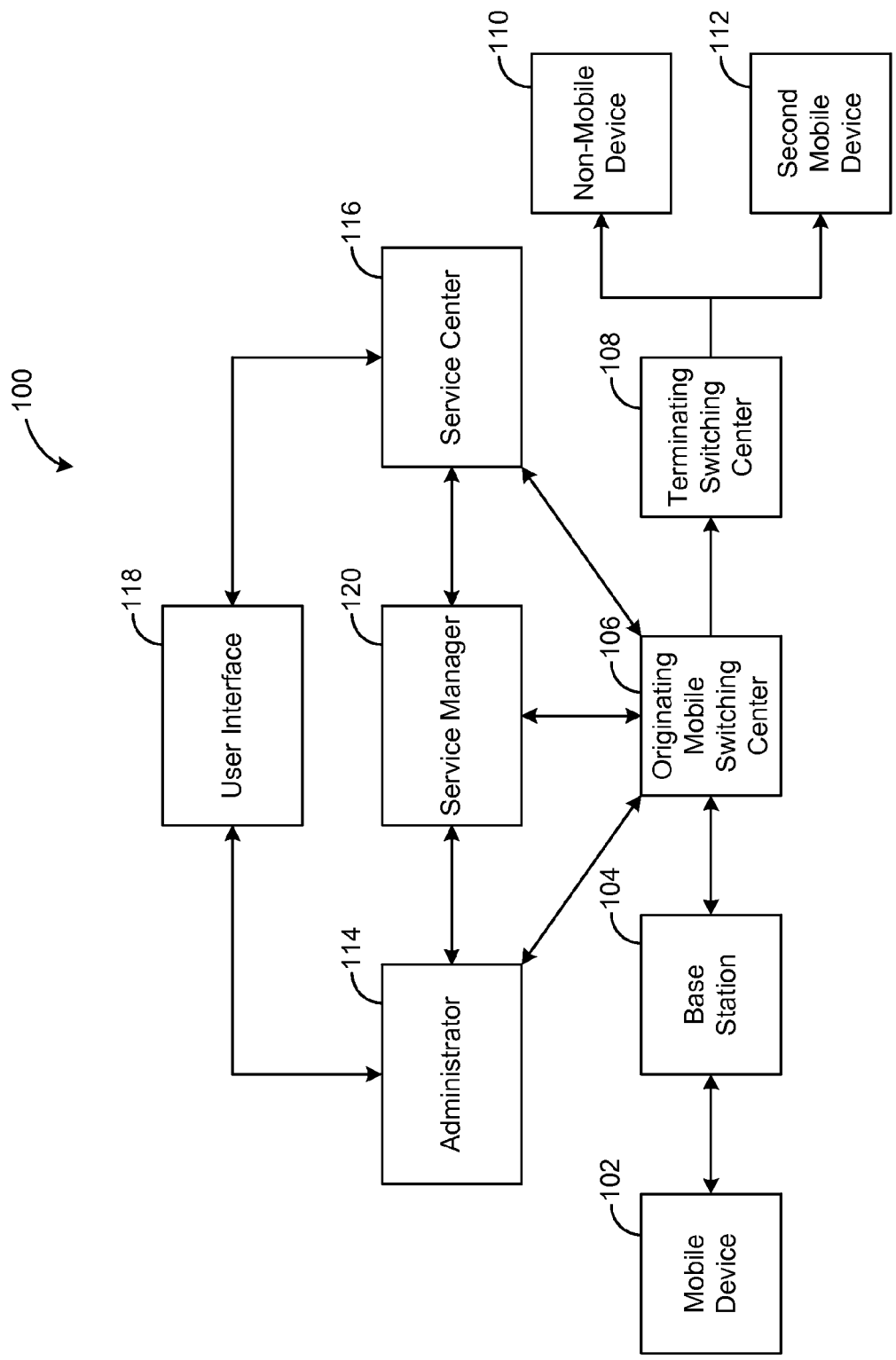
FIG. 1 is flow chart illustrating the process for initiating and permitting a service to be activated.

FIG. 1 illustrates a flow chart for a process of initiating and permitting a service to be activated 100 and to access one or more communication/data networks. While some embodiments are described herein in the context of the Lifeline program described above, which includes the Link-up subsidy, embodiments are not limited to the Lifeline/Link-up program. Embodiments may be used by companies and other organizations to manage their devices through the provision of a service in the same manner as described herein for Lifeline to control costs, prevent abuse, and better manage employees and other resources. For example, embodiments may be used to ensure that only current employees or authorized personnel are using company/entity funded services, or only using a single device, etc. Whether the service (often referred to as a "program" herein) is provided by a government program or a private entity, the service serves to pay for at least a part of the cost of the device utilizing the one or more communication/data networks.

As illustrated, a device, such as mobile device 102, may be utilized to generate a service request (e.g., a phone call, a data request, a text message, etc.). Mobile device 102 may first establish a connection with a base station 104. Base station 104 may include a radio access network ("RAN") base station, such as for global system for mobile communication ("GSM") RAN ("GRAN"), GSM enhanced data rates for GSM evolution ("EDGE") packet radio services ("GERAN"), universal mobile telecommunications system ("UMTS") RAN ("UTRAN") and Long Term Evolution ("LTE") RAN ("E-UTRAN"), but may also refer to any other form of base communication platform that allows a device to access a larger network. Base station 104 may connect to an originating mobile switching center ("O-MSC") 106 or a server. Upon receiving the origination request for a service from base station 104, O-MSC 106 may authenticate mobile device 102 by querying a visitor location register and a home location register to determine if mobile device 102 is registered with the telecommunications network and authorized for use on that network, collectively referred to as "validation."

Upon successful validation, O-MSC 106 may send a request to a service manager 120. This request may be based on various methods (e.g., IS-41, IS-771, IS-826, etc.). Service manager 120 may first authenticate the subscriber of mobile device 102 as a valid subscriber to the network ("network subscriber") based on first set of data obtained from the device, such as the device's mobile directory number ("MDN") and/or the device's mobile subscriber identification ("MSID"), and/or some other type of identifier. By being a network subscriber, a device is allowed to access the communications network. However, a network subscriber may not be a valid Lifeline subscriber. Service manager 120 may then collect a second set of data to determine whether mobile device 102 is a valid Lifeline or other program subscriber. Based on one or more determinations generated by service manager 120, the service request from mobile device 102 may be connected via a terminating switching center 108 to a non-mobile device 110 and/or a second mobile device 112.

Non-mobile device 110 may be a server, a website, a land-line phone, a desktop computer, etc. Second mobile device 112 may be a personal digital assistance, a mobile phone, a laptop, a notebook, a pager, etc.

Mobile device 102 may be connected via service manager 120 to an administrator 114 and/or a service center 116. The administrator 114 and/or the service center 116 may be distributed functions of the service manager 120. Mobile device 102 may by-pass service manger 120 to connect directly to administrator 114 and/or service center 116. Administrator 114 may be a party that is responsible for managing the Lifeline program which may be a third party and/or a government agency. Service center 116 may be a party that is responsible for handling customer concerns, phone failures, terminations, new customer sign-up procedures, data verification, etc. Administrator 114, service center 116, and/or another party may handle the duties described above. Further, mobile device 102 may have an internal module which handles the functions of service manager 120. The service manager functions (e.g., messaging, validations (authentication, eligibility, etc.), data entry, and/or database management) may be utilized in a client-server-based application, an in-network application, and/or a chipset used in the device. User interface 118 may allow individuals to communicate with administrator 114 and/or service center 116 via the Internet. In addition, the systems and methods described in this disclosure may be utilized with a wired line (e.g., non-mobile device 110). Further, the systems and methods described in this disclosure may be utilized with both mobile device 102 and non-mobile device 110.

Figure 2:
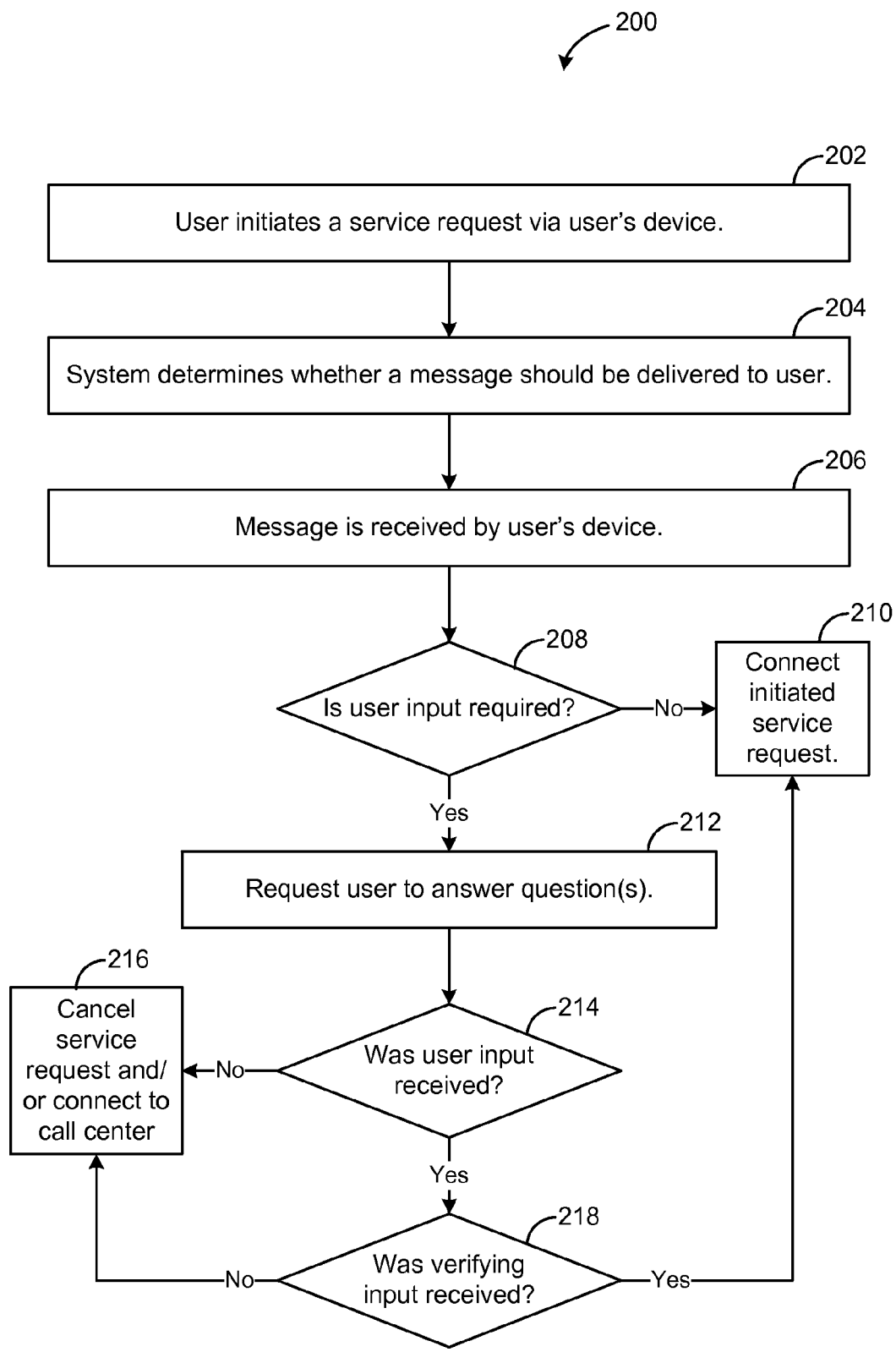
FIG. 2 is a flow diagram of an example procedure to transmit a message to the user and obtain information from the user.

FIG. 2 shows a flow diagram of an example procedure to transmit a message to the user and to obtain information from the user 200. Service manager 120, a control module 736 (see FIG. 7), and/or any other computing device may be utilized to implement this method or any other method described in this disclosure. A user may initiate a service request (e.g., a call, data request, etc.) via mobile device 102 (step 202). The system may determine whether a message should be delivered to the user (step 204), for example, after authenticating the user's device. If the system determines that no message should be delivered, then the service request may be completed. If the system determines that a message should be delivered, then the message may be received by mobile device 102 (step 206). The system may determine whether user input is required (step 208). For example, if the device is authenticated, a check may be automatically run to determine if the device is eligible without any further user input. If eligibility had just recently been determined, for example, it may not be necessary to re-determine eligibility for some period of time thereafter. The device identification may stand in as a surrogate for the user input necessary to determine eligibility.

If no user input is required, then the system may connect the initiated service request (step 210). If user input is required, then the system may generate and transmit a request for data (step 212). The system may determine whether data was obtained (step 214). If no data was obtained and/or incorrect data was obtained, then the system may cancel the service request and/or the system may connect the user to a call center (step 216). In another example, the system may cancel the service request, may connect the user to a call center, and/or connect the service request based on a predetermined or dynamic set of rules. No data may occur when the user does not enter any information. Incorrect data may occur when the user provides data that is not within parameters required to answer the request for data query. For example, the request for data may ask the user to select 1 for yes and 2 for no, but the user may not respond before a time out period passes or may have incorrectly entered 3 as a response. If data was obtained, then the system may verify that the data is correct (step 218). If the data is correct, then the system may connect the initiated service request (step 210). This data may be compared to data in a database for verification. If the data is incorrect, then the system may cancel the service request and/or the system may connect the user to a call center (step 216). In another example, the system may cancel the service request, may connect the user to a call center, and/or connect the service request based on a predetermined or dynamic set of rules.

The system may transmit pre-service request reminder messages. For example, a pre-service request reminder may be transmitted on a regular basis (e.g., once a week, once a month, on the first outbound call of the month, on the first data request of the week, on the first data request of the month, etc.) or on a dynamic basis which may be based on call volume of the individual user. In another example, mobile devices 102 may be grouped by the system to transmit the pre-service request message to group 1 during the first week of a schedule (e.g., month), to transmit the pre-service request message to group 2 during the second week, to transmit the pre-service request message to group 3 during the third week, and to transmit the pre-service request message to group 4 during the fourth week which may optimize bandwidth. In various embodiments, the groups could be increased/decreased to optimize bandwidth. In addition, the schedule increments could be increased/decreased to optimize bandwidth.

The pre-service request message may be "You are subscribed to a Lifeline service and must remain within the eligibility standards to continue service." In another example, the pre-service request message may be "You can only subscribe to one Lifeline service at a time. If you subscribe to more than one Lifeline service, your phone will be disconnected." The message may also state "Failure to comply with the rules of the Link-up/Lifeline program is a Federal offense punishable by a fine of $XX or Y years in prison or both."

Once the message is received, the system may allow the call (or other service request) through the PTSN or other network such that call set-up is completed. Since call set-up is after the warning, there may be no decrementing of the minutes allocated for the user's device under the Lifeline program.

Once the pre-service request message has ended, the user may be connected to their original call destination. This pre-service request message may not be skipped, fast forwarded, or by-passed.

The pre-service request message may be utilized as a public service announcement. For example, the message could state "Day-light savings time is this Saturday." In another example, the message could state "The deadline for school registration is August 1."

A message delivered to the user device, such as a request for data, may be utilized to verify the user's eligibility requirements. For example, the user may be asked to input which program (e.g., Welfare, Supplemental Nutrition Assistance Program, Federal Housing Assistance Program, etc.) they are currently enrolled in, any other program criteria (e.g., income, number of household members, etc.), their name, their address (e.g., current and/or past), voice print data, social security number, a picture which may be obtained using their mobile device 102, other biometric data, and/or any other data. The system may also verify that the user is not a subscriber to any other Lifeline services. For example, the system may ask "Are you a subscriber to any other Lifeline services? Please say yes or no." All of information described in this disclosure may be entered utilizing a keypad function and/or a voice recognition function.

The eligibility rules may be customized for each agency administering and/or reimbursing for program eligibility, such as a state, a state department, or any group assigned such responsibility, to allow for the specific rules from the reimbursing entity to be utilized. For example, the state of Oklahoma may use food stamp eligibility to qualify participants in the Lifeline program. The state of Texas may use whether an individual's children are eligible to receive a free school lunch. Since this is a Federal program which is administered by the states, the system may be configured to utilize the techniques/rules used by each individual state. As used herein, the term "eligibility" is not to be confused with other forms of access or security control, such as requiring a user to enter a user name and password in order to access a computer, phone, software program, account, etc. While information may be obtained from the user so as to identify the user, determine the program for which eligibility is required, and other information, the eligibility determination is not based upon the user supplied information alone. Once user supplied information is obtained, the eligibility determination may be made without any further user input and may not be made solely based on real-time user input data, such as by obtaining information about the user from other data sources, determining eligibility requirements from various systems, obtaining information from the device being used by the user to access the program (such as device identification), etc.

In another example, a user may have to provide an answer to a secret question which is customized to them. This secret question may be where the individual went to school, what is the name of the individual's dad, what is the individual's favorite team, etc. This secret question may be created when the individual signs up and/or activates their account. This secret question may be utilized to verify the user's account on a periodic basis and may be changed periodically.

In another example, a text message may be periodically sent to the user which has the same message content as the pre-call messages and/or the request for data messages.

Figure 3:
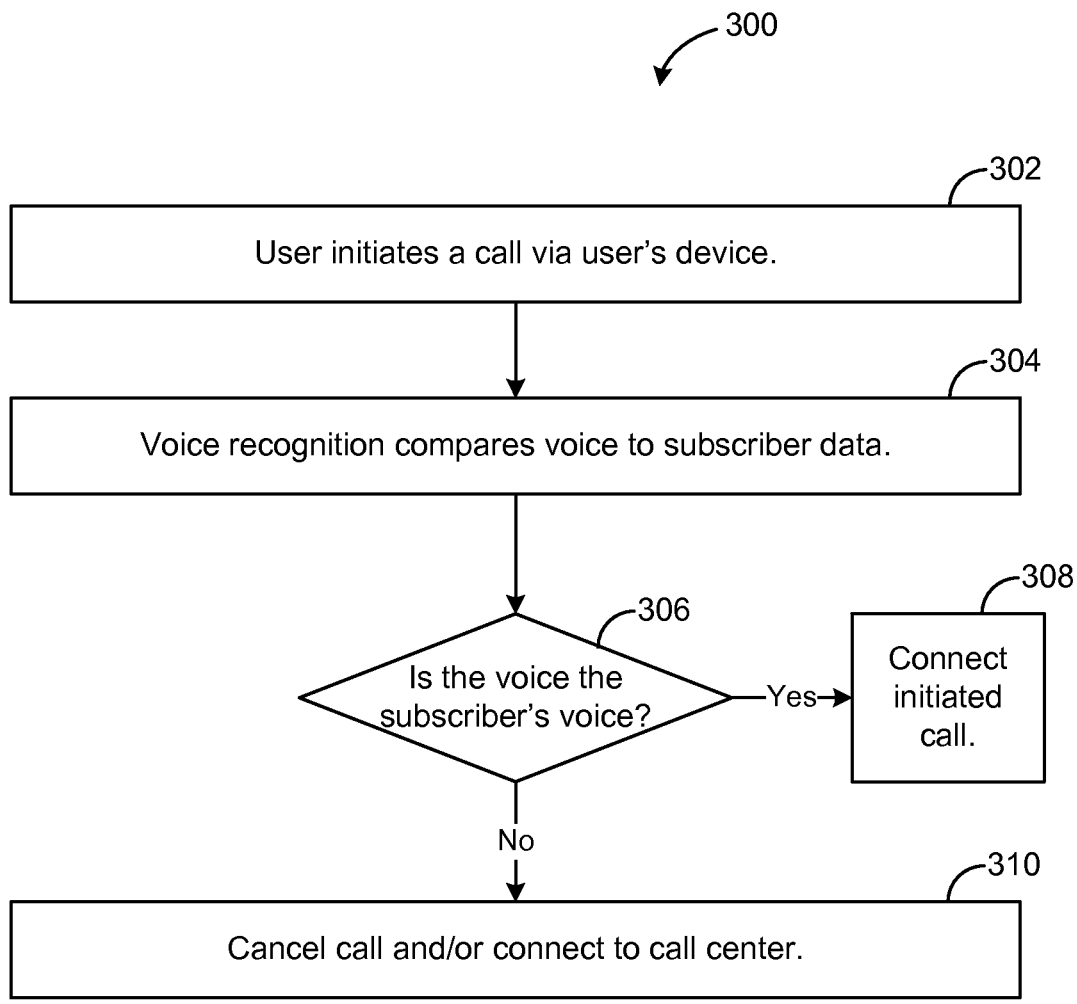
FIG. 3 is a flow diagram of an example procedure utilizing voice recognition to verify a subscriber.

In FIG. 3, a flow diagram of an example procedure to utilize voice recognition to verify a subscriber 300 is shown. A user initiates a service request via mobile device 102 (step 302). A voice recognition module may compare the user's voice to data relating to the subscriber's voice (step 304). The voice recognition module may determine whether the user's voice is the subscriber's voice (step 306). If the user's voice is the subscriber's voice, then the system connects the service request (step 308). If the user's voice is not the subscriber's voice, then the system may cancel the call and/or connect the user to the call center (step 310).

The system may be configured to allow a subscriber's voice to be more than one voice. For example, a husband and wife may share the same mobile device 102 provided by Lifeline. In addition, the whole family (e.g., husband, wife, son(s), and daughter(s)) may be allowed to utilize mobile device 102. Therefore, subscriber's voice may include the voice of the husband, wife, son(s), daughter(s), and/or any combination thereof.

In another example, different users may be allowed to use mobile device 102 without having their voice data being part of the subscriber's voice as long as periodically, the voice-verified original user provides responses to the verification questions. In another example, non-subscribers may be able to utilize mobile device 102 based on the subscriber's voice being verified at any time. These verifications may happen before the call or during the call. For example, the system may sample the user's voice during a phone call and compare it to a voice print. In addition, the verification schedule may be daily, weekly, monthly, or any other time period.

There can be numerous temporal methods of validation. The temporal aspect of validations may be implemented: (1) before each call, SMS and/or data session; (2) periodically (e.g., hourly, daily, weekly, monthly, etc.); or (3) randomly across time. In the case of random validation, the system may randomly select certain devices and actions from a pre-set pool of devices/MDNs/users. The frequency of such validations may be varied, such that, for example, the probability of a user/device in a pool (the size of which may or may not be dynamic itself) may range from very small to 1 for some given period of time. The system may also combine random validation with other periodic validations.

The system may utilize different types of validations. For example, the system may validate against a database of registered users. The users may be associated at enrollment with a MDN or similar number. The database may be maintained by the program owner, its designee (e.g., the service provider), and/or another party (e.g., a master database manager which may manage all the data from each provider).

The system may utilize a third party database for validations. For example, the system may utilize an interface with a database of people in a particular state or other jurisdiction who are eligible for food stamps, receiving WIC, disability subsidies, and/or any other criteria for validating users.

The system may utilize affirmative user validation for the validation procedure. For example, the system may request the user to answer a question to affirm their eligibility. There may be several types of affirmative validations including: (a) "If you are eligible, press 1"; (b) "If you are eligible, please say 'I am eligible and state your name'" (this may be recorded and stored for auditing); (c) voice recognition—the validation may be effected using a stored voice record and matching it (or not) against something spoken by the user at the time of validation.

The system may utilize the devices's geo-location or geo-code (e.g., latitude+longitude+time/date) for validation. For example, a geocode record may be created for the device. The system may compare a new geocode record against geocode records of all other devices in a pool. Those geocode records most closely correlated in space-time may be investigated and/or audited.

The system may complete a validation procedure which determines that a specific user can use the service. The system may validate the eligibility of the user who is attempting to use the device for a specific purpose. For example, the system may determine if the user meets the income requirements.

The system may complete a validation procedure which determines that a specific user has no more than one device under the program. For example, the system may prompt the user to certify that the user has only one phone under this program. The system may require the user to enter their name and/or MDN (or other identifier), which may be checked against a database.

The system may complete a validation procedure which determines that no more than one (or a set number) of device(s) associated with or are being used in one household (e.g., at one fixed address). The system may cross-check against one or more databases that have data which may include addresses of registered users. The system may request that the user input their address.

The system may complete a validation procedure which determines that the user is authorized to use the specific device (by MEIN, serial number or other unique device identifier). For example, the system may match the user's information against a database which links each registered user with the device MEIN or similar identifying number unique to the device (e.g., the device that the user is trying to use to make a call, send an SMS, or set up a data session).

The system may complete the validation procedure in the call or data-session set-up process. The system may complete this validation procedure before set-up is completed. The validation steps may be based on business program rules versus any form of government program rules.

The system may include a validation rules engine—where the business program rules for validation reside. The system may also include a validation enforcer—the element that may determine a call set-up, SMS passage, and/or data session commencement.

The system may utilize validation calls which may be out-bound (e.g., robo-calls). The user may not be rated and/or billed for these calls (e.g., no cost to the validated party). The system may state "You must be eligible for this program . . . there are penalties if you are breaking the rules." The system may require the user 'press 1' or do something else to confirm that the user agrees and that the user is complying with the rules (e.g., in fact eligible for the program and/or only using the allowed number (e.g., one) of phone(s) per household).

The system may use a credit card verification process (where the user is not charged) to permit the user to proceed with using the service/device.

The system may complete a validation process when a user tops-ups a prepaid subsidized device. For example, if a user tops-ups a Lifeline device, the system may enter this data in a database. If the system determines that this same user had topped-up another device, and both devices are active at the same time, the system may identify this potential fraud and deactivate one of the devices (or generate a report, request a validation, suspend service, etc.). The system may utilize business program rules to determine which device(s) to deactivate (e.g., the first device that was topped-up, the last device activated, etc.), and what to do with any balances (e.g., move any balances to an active account, transmit these balances back to the service provider or government entity, etc.). This may keep the user on the platform, but may prevent them from topping up multiple devices for their own use.

The system may include a data-gathering step in the activation process that may be utilized for validation. For example, the system may complete activations via interactive voice response ("IVR") that requires one to enter certain information. The system may captured this information and store it in a database. The system may compare new activations to the data in the database to prevent duplicate activations for an individual or household. The system may compare a driver's license number to reduce duplicate accounts.

Figure 4:
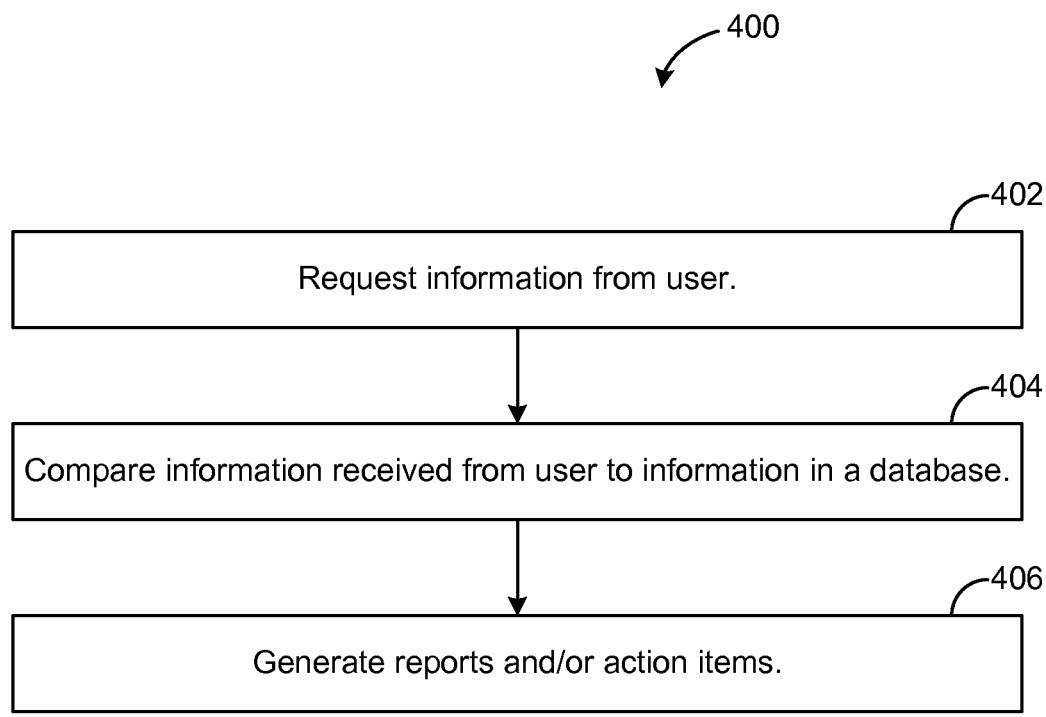
FIG. 4 is a flow diagram of an example procedure to compare user data to information in a database.

FIG. 4 is a flow diagram of an example procedure to compare user data to information in a database 400. The system may request information from a user (step 402). The system may compare the information received from the user to information in a database (step 404). The system may generate reports and/or initiate action items (step 406). The database may include eligibility criteria, user data (e.g., name, address, phone number, income, number in household, social security number, job, voice data, picture, calling patterns, geographic patterns, biometric data, etc.), verification status, verification history (e.g., number of times found ineligible, answers to verification questions, dates of verification requests, method of verifications, etc.), mobile device data (e.g., age, date acquired, monthly minutes used, monthly minutes left, usage history, maintenance history, location history, phone call history (e.g., received, placed, and missed), website history, filtered data history, next upgrade date, third party service provider), data on third party service provider, reporting history, and/or action item history. The database may be updated and accessed in real time.

Figure 5:
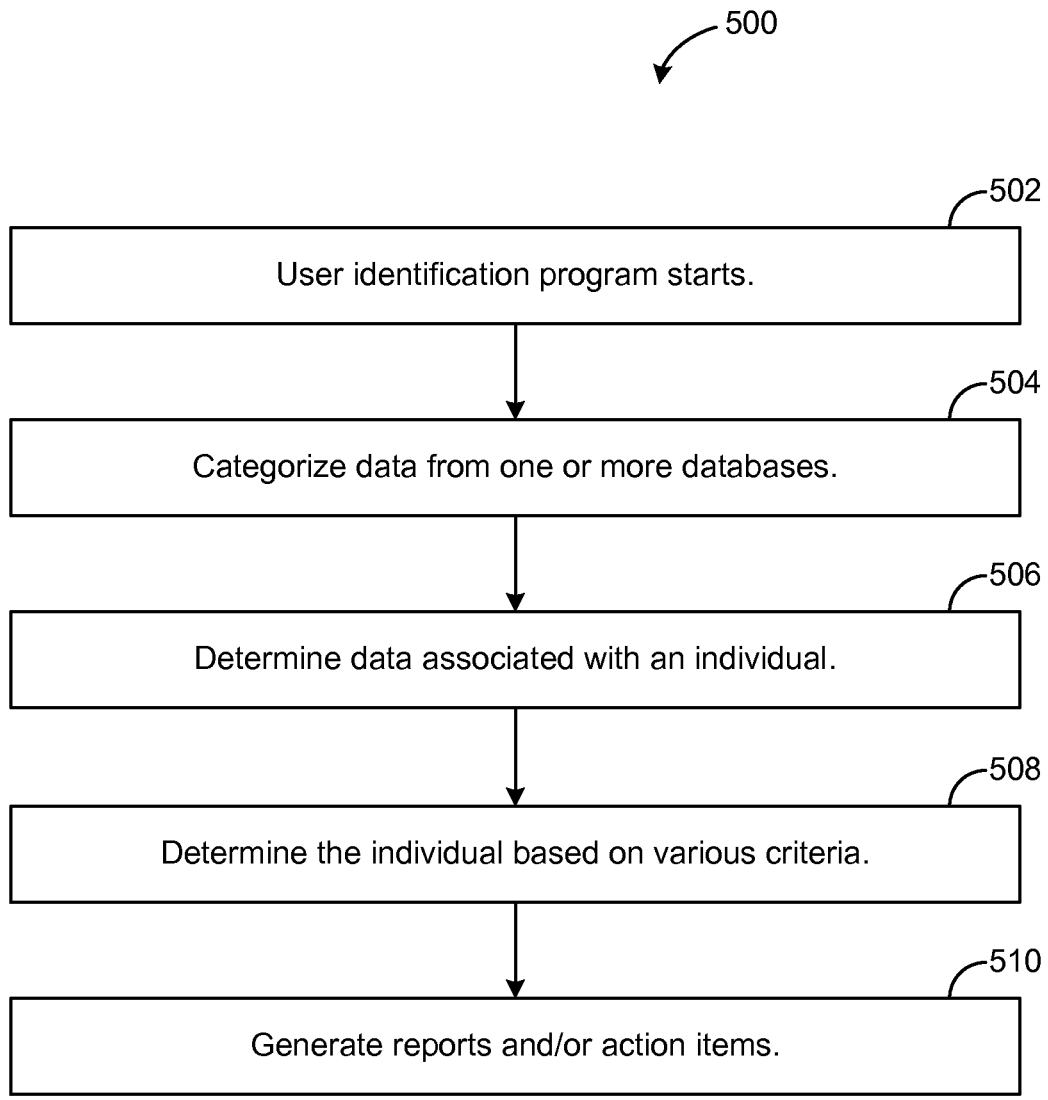
FIG. 5 is a flow diagram of an example procedure for determining individual users from a database.

In FIG. 5, a flow diagram of an example procedure for determining individual users from a database of data compiled on various users 500 is shown. The system may start a user identification program (step 502). The system may categorize data from one or more databases (step 504). The system may determine data associated with an individual (step 506). The system may determine which individual is associated with this data based on various criteria (step 508). The system may generate reports and/or action items (step 510).

A master database may be generated across more than one Competitive Local Exchange Carriers ("CLECs"). This may reduce the number of individuals with multiple Lifeline accounts. The system may use a combination of unique-identifier heuristics that may include one or more of the following items: name; address; voice print; calling pattern; social security number; location data (e.g., GPS data); user picture; driver's license number, and/or biometric data. In addition, the system may utilize developed algorithms based on the items above to verify accounts and/or determine duplicate account data.

For example, the system may compare customer data (e.g., names, addresses, voice prints, social security numbers, user pictures, driver's license numbers, and/or biometric data) in the master database to generate a duplicate account report, cancel duplicate account services, generate letters to the subscribers with a notice of cancelation, generate a text message to the subscribers with a notice of cancelation, remove individuals from the program, suspend service, and/or generate a verification request. A verification may be performed at any time to determine if a user is violating any terms regarding use of the program, such as using more than one device on the service, using more than one service, allowing other people to utilize the device or service, or otherwise committing some type of fraud or illegal activity.

In another example, the system may have a Joseph Smith and a Joe Smith in the database. The system may utilize other data to determine whether Joseph Smith and Joe Smith is the same person. The system may compare the calling patterns and/or location data to determine whether there are more than one Lifeline accounts for any individual. The system may also use any combination of the data above to generate a duplicate account report which may include probabilities.

For example, the system may determine that the calling histories for Joseph Smith and Joe Smith show that a high percentage (e.g., 65%) of their calls are to the same people. Calling histories could also be used to make an initial determination that a device is being used to carry out illegal activity, such as drug dealing. If calls are made to a device owned by someone with a criminal record, a verification flag could be generated. In the same manner that the user's voice could be scanned periodically during a call to identify the user, calls could be automatically screened for certain words associated with potentially illegal activity, thereby causing a verification flag to be raised.

In another example, the system may determine based on the location histories for Joseph Smith and Joe Smith that they are at the same place during a certain time of day (e.g., at night, during working hours, etc.) and/or have a location pattern with a high correlation.

The system may detect highly unusual/atypical service request (e.g., calling, texting, website request) patterns compared to the user's normal patterns. The system may rais a verification flag and/or suspend service to mobile device 102 and the system may route all calls/tests/data requests to a server that replies with a message stating "Please contact us in order to reestablish your service."

If a verification flag is raised or an individual otherwise fails a verification test and/or is determined to have duplicate accounts, the system may take no action, may generate reports, may require the user to clear the flag, may request immediate re-verification at the next opportunity, may initiate re-verification through secondary means (e.g., if voice verification fails, try text, call center, or other means), may suspend service, the system may terminate the account, or any combination thereof which may be based on predetermined or dynamic rules.

In another example, if the user fails a verification process limit (e.g., user fails verification three times in a row), the system may redirect all outbound calls to a verification system and/or a representative (e.g., administrator, call center, and/or other hotline) to avoid unnecessary suspension of service.

Eligibility status may be determined by utilizing any of the verification procedures or any combination of these verification procedures disclosed in this disclosure. For example, the system may generate an eligibility status by determining that the participant only has the appropriate number (e.g., one, two, etc.) of devices for a specific program (e.g., Lifeline). In another example, the system may generate an eligibility status by determining that the party utilizing the device is an actual participant. Further, the system may generate an eligibility status by determining that the participant meets other program criteria (e.g., Welfare, Supplemental Nutrition Assistance Program, Federal Housing Assistance Program, income, number of household members, or any other criteria) to be and/or remain eligible for the specific program (e.g., Lifeline, Link-up, etc.).

Figure 6:
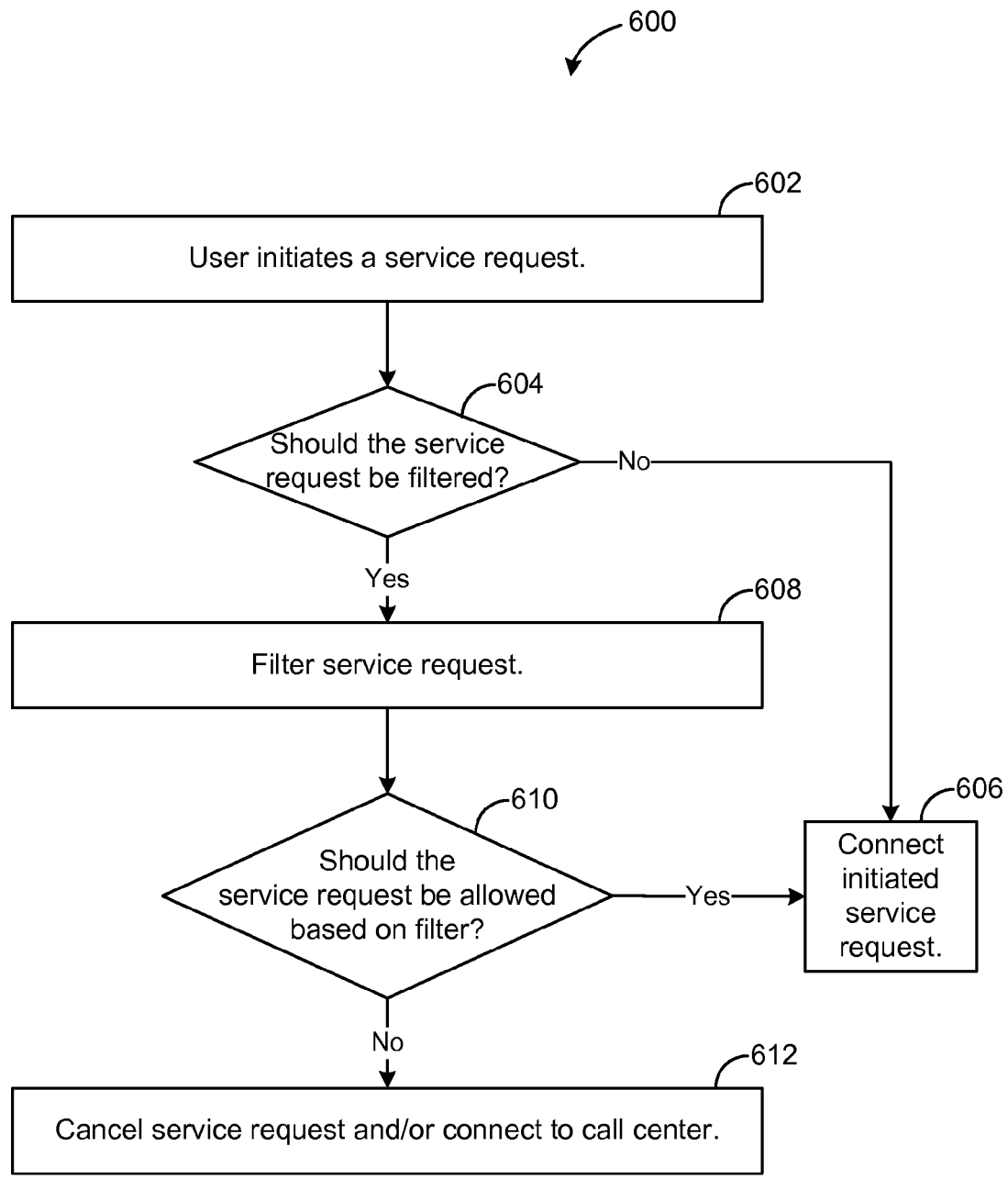
FIG. 6 is a flow diagram of an example process for utilizing a filter to determine whether to allow a service request.

FIG. 6 is a flow diagram of an example process for utilizing a filter to determine whether to allow a service request 600. The user may initiate a service request (step 602). This service request may be a request to access to an Internet website. The system may determine whether the service request should be filtered (step 604). A service request may not be filtered based on the rules established for mobile device 102. For example, a first service provider may establish filtering rules. A second service provider may not establish filtering rules. While, a third service provider may establish filtering rules that are different than the filtering rules established by first service provider. In another example, a first user may have established filtering rules for their household. A second user has not established filtering rule for their household. While, a third user has established filtering rules that are different than the rules established by first user. If the system determines that no filter should be applied, then the system may connect the service request (step 606). If the system determines that a filter should be utilized, then the system may filter the service request (step 608). The system may determine whether the service request should be allowed based on the filter (step 610). If the system determines that the service request should be allowed, then the system may connect the service request (step 606). If the system determines that the service request should not be allowed, then the system may cancel the service request, connect the user to the call center, generate a report, and/or generate an action item (step 612).

The service request may be a phone call and/or text message which may be filtered. For example, a student may be prohibited from receiving and/or transmitting phone calls and/or texts during school hours. A parent may have decided that their children cannot make a phone call to certain numbers (e.g., people that the parents do not want their children associating with).

Based upon rules established by a third party (e.g., the paying entity), the system may redirect the users to specific messages. For example, if a user tries to access a social-networking site, the system may display a message that states "Be careful about submitting personal data on the internet." In another example, the system may block access to malware sites (e.g., a phishing site that is posing as a bank). After the user views the message, the user may either be redirected back to their original destination or they may be blocked based on the rules established by the third party.

In one example, the system may be a computing device. The computing device may include one or more processors configured to obtain data relating to a mobile device program from a mobile device. The one or more processors may determine an eligibility status for the mobile device program based at least in part on the obtained data.

In another example, the computing device may include one or more processors configured to obtain data relating to a non-mobile device program from a device. The one or more processors may determine an eligibility status for the non-mobile device program based at least in part on the obtained data. The device may be mobile device 102 or non-mobile device 110.

Further, the computing device may include one or more processors configured to obtain data relating to both a mobile device program and a non-mobile device program from a device. The one or more processors may determine an eligibility status for the mobile device program and/or the non-mobile device program based at least in part on the obtained data. The device may be mobile device 102 or non-mobile device 110.

The computing device may also be utilized by a company or other organization to manage its devices. For example, the systems and methods described in this disclosure may be utilized to ensure that only current employees are using company-funded services (e.g., mobile device). Further, the systems and methods described in this disclosure may verify that employees are only using the assigned number (e.g., one, two, etc.) of company devices (e.g., mobile device, PDA, laptop, etc.) assigned to them.

Figure 7:
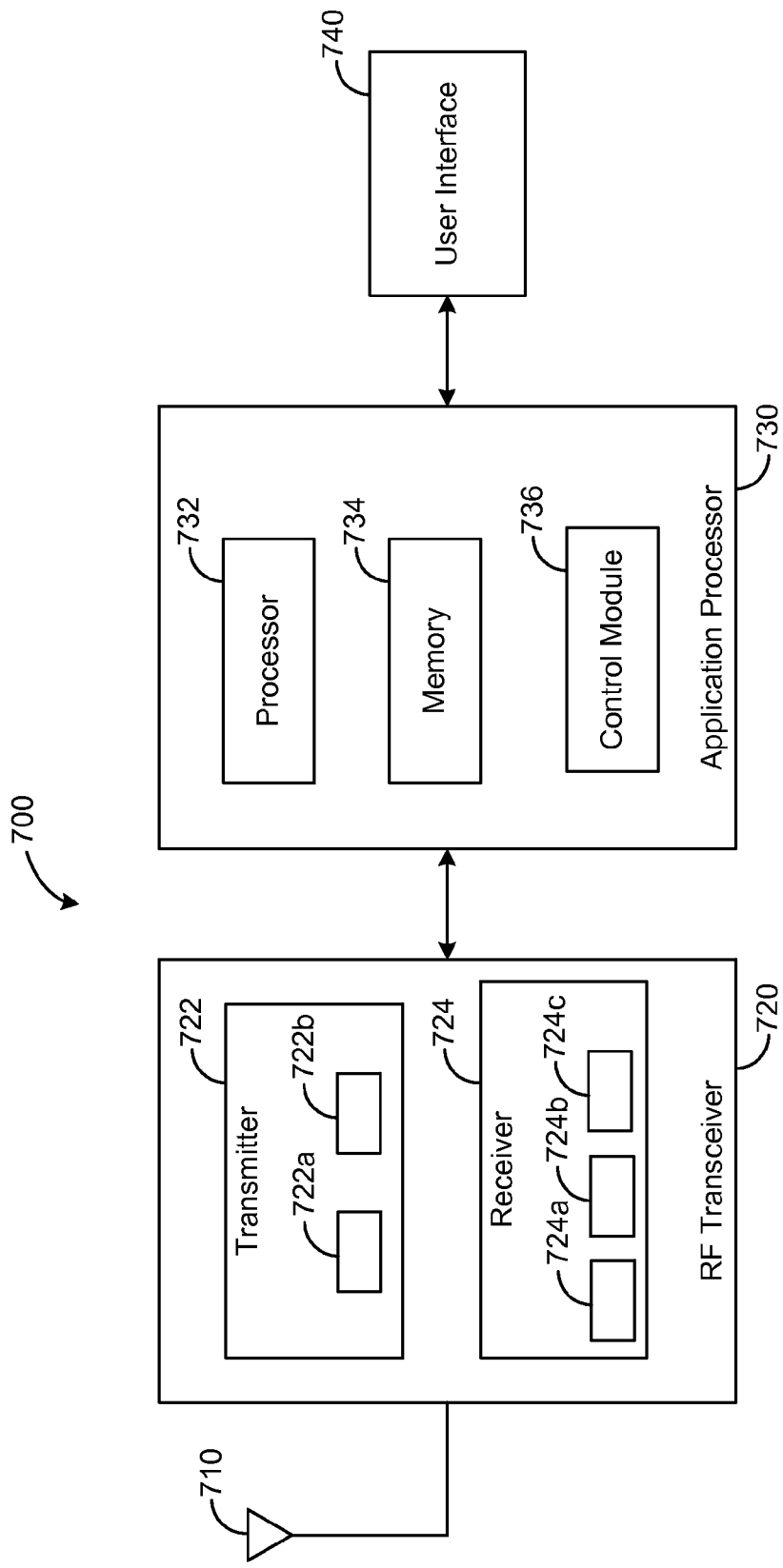
FIG. 7 is a schematic block diagram illustrating an example device.

FIG. 7 is a schematic diagram of mobile device 700. Mobile device 700 may comprise any type of wireless communication device, such as a wireless telephone, including cordless telephones, cellular telephones, Personal Communication System ("PCS") telephones, or another type of wireless telephone. Mobile device 700 may also comprise a two-way radio, such as a walkie-talkie, or other type of communications transceiver. Mobile device 700 may also include circuits to receive and/or transmit Bluetooth, 802.11, or other types of wireless signals.

Mobile device 700 may include control module 736. Control module 736 may be used for the verification process, the filtering process, the data tracking process, or any control process for mobile device 700.

Mobile device 700 may be described as having three basic functional blocks, an RF transceiver 720, an application processor 730, and a user interface 740. Antenna 710 may be used as the interface between a wireless channel and the remaining blocks of the mobile device 700. Although only one antenna 710 is shown, a mobile device may utilize more than one antenna.

Signals received by mobile device 700 are coupled from the antenna 710 to RF transceiver 720. In a complementary fashion, signals to be transmitted by mobile device 700 are coupled from RF transceiver 720 to antenna 710.

RF transceiver 720 comprises a transmitter 722 and a receiver 724. Signals received by mobile device 700 are coupled from antenna 710 to receiver 724 within RF transceiver 720. Receiver 724 may filter, amplify, and downconvert the received signal to a received baseband signal having a desired bandwidth and amplitude. Receiver 724 may also perform demodulation of the received RF signal. Receiver 724 may be capable of processing signals from a plurality of frequency bands. For example, receiver 724 may receive signals from a GPS band as well as from a secondary communication band. If receiver 724 is designed to receive signals from a plurality of frequency bands, receiver 724 may implement a plurality of receive paths. Alternatively, receiver 724 may comprise a plurality of receivers 724a, 724b, and 724c. Each of the receivers, 724a, 724b, and 724c, may independently filter, amplify, downconvert, and demodulate one of the plurality of received signals. Transmitter 722 may also comprise a plurality of transmitters 722a and 722b for transmitting signals from the RF transceiver 720.

Application processor 730 may operate on both the transmitted and received baseband signals. Application processor 730 may also perform functions local to mobile device 700. These local functions may include managing control settings, manipulating files stored within mobile device 700, and managing various interfaces to user devices. Application processor 730 may comprise a processor 732 and a memory 734. A series of instructions or program may be stored in memory 734 that may be read by processor 732.

User interface 740 provides means for transmitting received signals to the user and also provides means for coupling signals from the user to mobile device 700. The means for coupling the signals to the user may include, but are not limited to, an audio device such as a speaker or other transducer, a display, which may be a character display, segment display, bit mapped display, or indicators, an electrical connection for coupling electrical signals to a corresponding user device, a mechanical device such as a vibration source to indicate an incoming message, or any other suitable means for communicating information from mobile device 700 to a user or user device. The means for coupling signals from the user to mobile device 700 may include, but are not limited to, a microphone, a keypad, a touch screen, an electrical connection, an optical input, or any other suitable means for coupling user signals to mobile device 700.

Processor 732 is representative of one or more circuits configurable to perform at least a portion of a data computing procedure or process. By way of example but not limitation, processor 732 may include one or more processors, controllers, microprocessors, microcontrollers, application specific integrated circuits, digital signal processors, programmable logic devices, field programmable gate arrays, and the like, or any combination thereof.

Memory 734 is representative of any non-transitory data storage mechanism. Memory 734 may include, for example, a primary memory or a secondary memory. Primary memory may include a random access memory, read only memory, etc. Secondary memory may include the same or similar type of memory as primary memory or one or more data storage devices or systems, such as, for example, a disk drive, an optical disc drive, a tape drive, a solid state memory drive, etc.

As used herein, the term "mobile device" refers to a device that may from time to time have a position that changes. Such changes in position may comprise changes to direction, distance, and/or orientation. In particular examples, a mobile device may comprise a cellular telephone, wireless communication device, user equipment, laptop computer, other personal communication system ("PCS") device, personal digital assistant ("PDA"), personal audio device ("PAD"), portable navigational device, or other portable communication devices. A mobile device may also comprise a processor or computing platform adapted to perform functions controlled by machine-readable instructions.

The term "acquire" or "obtain" as used herein as it relates to wireless signals received at a mobile device refers to a mobile device obtaining sufficient signal attributes or symbols from a wireless signal to enable processing of the received wireless signal to obtain at least some information therein.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

Reference throughout this specification to "one example," "an example," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

What is claimed:

1. A computing device comprising:
    one or more processors configured to obtain a first set of data from a device for storage in a non-transitory memory to authenticate the device for access to one or more communication/data networks, and when the device is authenticated the one or more processors being further configured to obtain a second set of data for storage in the non-transitory memory to determine an eligibility status for the device to utilize one or more third party wireline, wireless or broadband services utilizing the one or more communication/data networks at a reduced cost rate, the second set of data including real-time user input data and data associated with an eligibility rule that is not based on the real-time user input data and is based on financial information about a user, the eligibility rule received from an entity responsible for administering the third party services, and upon determining the eligibility status the one or more processors being further configured to permit a service request that utilizes the one or more communication/data networks.

2. The computer device as recited in claim 1, wherein some data, but not all data, in the first set of data and some data in the second of data are the same.

3. The computer device as recited in claim 1, wherein the first set of data includes data identifying the device.

4. The computer device as recited in claim 1, wherein the second set of data includes one or more of data indicative of an identity of the user, a voice of the user, an image of the user, or information other than an identity of the user.

5. The computer device as recited in claim 1, wherein the second set of data includes data indicative of the service.

6. The computer device as recited in claim 1, wherein the second set of data identifies whether the user is violating any terms of use of the third party services.

7. The computer device as recited in claim 1, wherein the eligibility status is determined before permitting the service request.

8. The computer device as recited in claim 1, wherein the eligibility status is determined during the service request.

9. The computer device as recited in claim 1, wherein the third party services are provided by a first entity and the eligibility status is determined a second entity.

10. The computer device as recited in claim 9, wherein the first entity is a national government and the second entity is a regional government.

11. The computer device as recited in claim 1, wherein the second set of data identifies a physical location of the device at the time of the service request.

12. The computer device as recited in claim 1, wherein the one or more processors are further configured to send a message to the device before permitting the service request.

13. The computer device as recited in claim 12, wherein the user of the device is prevented from skipping, forwarding or bypassing the message.

14. The computer device as recited in claim 1, wherein the one or more processors are further configured to obtain a third set of data for storage in the non-transitory memory to filter the service request after the service request has been permitted.

15. The computer device as recited in claim 14, wherein the one or more processors are configured to filter the service request by blocking the service request, or blocking data to be transmitted to the device per the service request.

16. The computer device as recited in claim 1, wherein the one or more processors are configured to send a message to the device if the service request has been filtered.

17. The computer device as recited in claim 1, wherein the one or more processors are contained within a service manager.

18. The computer device as recited in claim 17, wherein the service manager is within the one or more communication/data networks.

19. The computer device as recited in claim 17, wherein the service manager is within the device.

20. A method for regulating a device, comprising the steps of:
    obtaining a first set of data from the device;
    authenticating the device for access to one or more communication/data networks based on the first set of data;
    when the device is authenticated, obtaining a second set of data;
    determining an eligibility status based on the second set of data for the device to utilize one or more third party wireline, wireless or broadband services for utilizing the one or more communication/data networks at a reduces cost rate, the second set of data including real-time user input data and data associated with an eligibility rule that is not based on the real-time user input data and is based on financial information about a user, the eligibility rule received from by an entity responsible for administering the third party services; and
    upon determining the eligibility status, determining whether to permit a service request that utilizes the one or more communication/data networks.

* * * * *